April 30, 1968

R. E. GARRETT 3,380,234

LETTUCE HARVESTER

Filed June 5, 1964

INVENTOR.
ROGER E. GARRETT
BY
Lothrop & West
ATTORNEYS

April 30, 1968

R. E. GARRETT 3,380,234

LETTUCE HARVESTER

Filed June 5, 1964

INVENTOR.
ROGER E. GARRETT
BY
Lothrop & West
ATTORNEYS

April 30, 1968 R. E. GARRETT 3,380,234
LETTUCE HARVESTER

Filed June 5, 1964 5 Sheets-Sheet 5

INVENTOR.
ROGER E. GARRETT
BY
Lothrop & West
ATTORNEYS

United States Patent Office 3,380,234
Patented Apr. 30, 1968

3,380,234
LETTUCE HARVESTER
Roger E. Garrett, Davis, Calif., assignor to The Regents of the University of California, Berkeley, Calif.
Filed June 5, 1964, Ser. No. 373,011
14 Claims. (Cl. 56—327)

My invention relates generally to a machine which can be advanced in a field in which head lettuce is growing for the purpose of removing the lettuce heads from the field and starting them on a conveyer for further processing. A device of this nature and for the same end result is shown in my copending application Ser. No. 335,550 filed Jan. 3, 1964, and assigned to the assignee of the present application.

It is becoming increasing necessary to accomplish much of the labor of removing produce such as lettuce, cabbage and the like from the growing field by machinery rather than by hand. As disclosed in the above-mentioned application, I have already provided a mechanism which advances along lettuce rows and is sensitive to and detects and signals the presence of only those lettuce heads appropriate for harvesting. A harvesting mechanism then severs the selected heads and starts their removal from the field, leaving behind those heads not yet suitable for gathering. The present invention is not concerned with details of the sensing or detecting mechanism, although such mechanism is utilized, but is more particularly concerned with a means of improved nature for severing the selected lettuce heads from their roots and for handling the heads from their growing location to a subsequent location for further processing.

Reference is had to lettuce as an example of the produce involved, although the same or appropriately modified structure can be utilized with other produce having reasonably camparable characteristics. Produce such as lettuce is quite susceptible to injury in handling and is substantially downgraded at the market in the event harvesting injuries are apparent. Produce such as lettuce is also relatively difficult to handle for the reason that the plant includes a central, globular, relatively compact and firm head surrounded by a number of additional relatively loose and limp individual leaves often referred to as wrapper leaves.

It is an object of this invention to provide a lettuce harvester in which the lettuce head is gently supported while it is being severed from its growing root and is transported from growing position onto the harvesting mechanism with little or no likelihood of injury.

Another object of the invention is to provide a lettuce harvester in which the wrapper leaves do not interfere with the normal operation of the harvesting mechanism.

A still further object of the invention is to provide a lettuce harvester effective to withdraw a selected lettuce head from its growing position in a sequence of lettuce heads without injury to the adjacent heads.

Another object of the invention is to provide a lettuce harvester effective to accommodate lettuce heads of varying sizes and contours within a wide range.

Another object of the invention is in general to provide an improved lettuce harvester, particularly as to the severing and transporting portions thereof.

Other objects of the invention together with the foregoing are set forth in the embodiment of the invention described in the accompanying description and illustrated in the accompanying drawings, in which.

Figure 1:
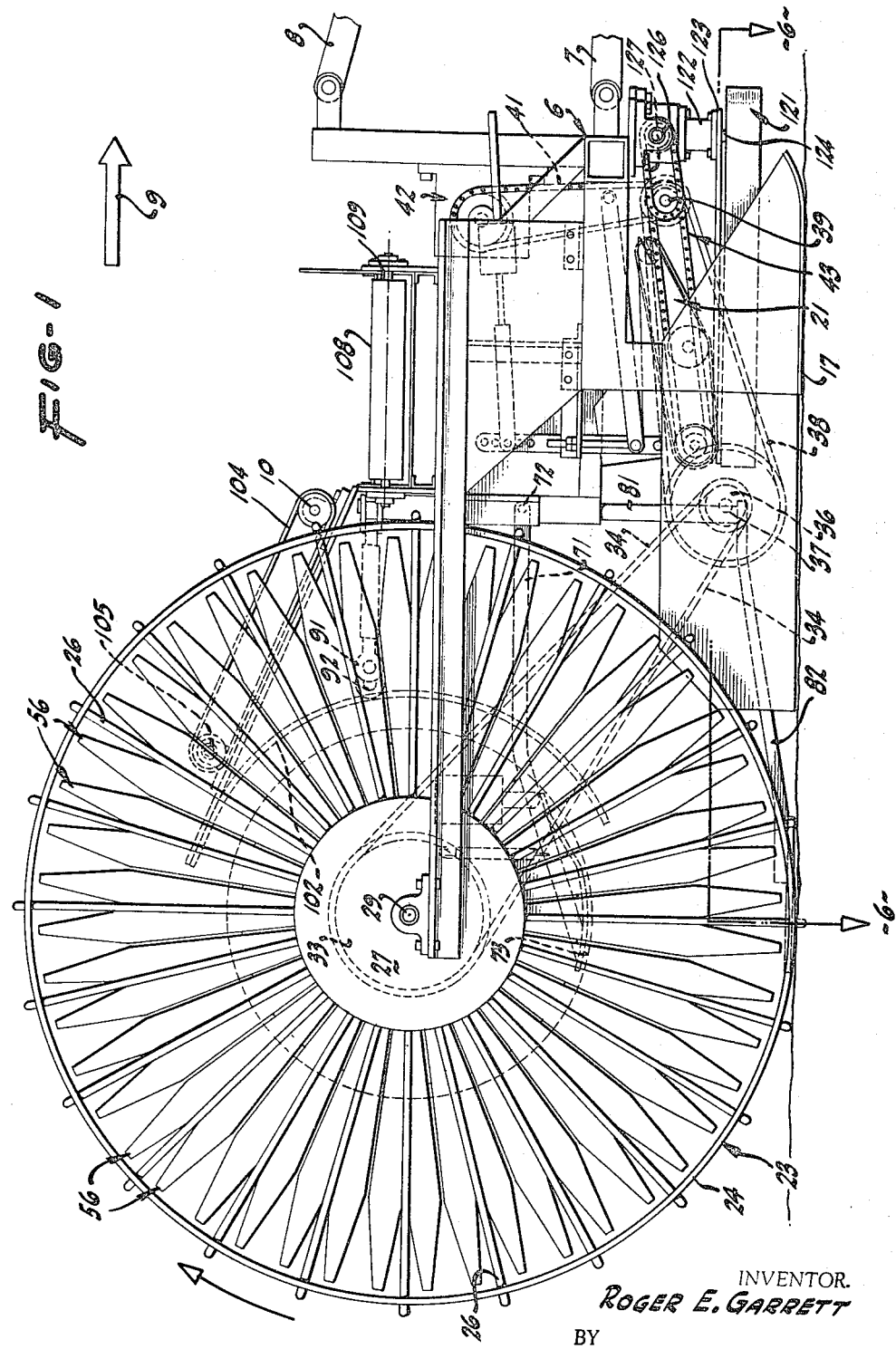
FIGURE 1 is a side elevation of a lettuce harvester constructed pursuant to this invention and located in a field in which adjacent lettuce heads grow in a row.
Figure 2:
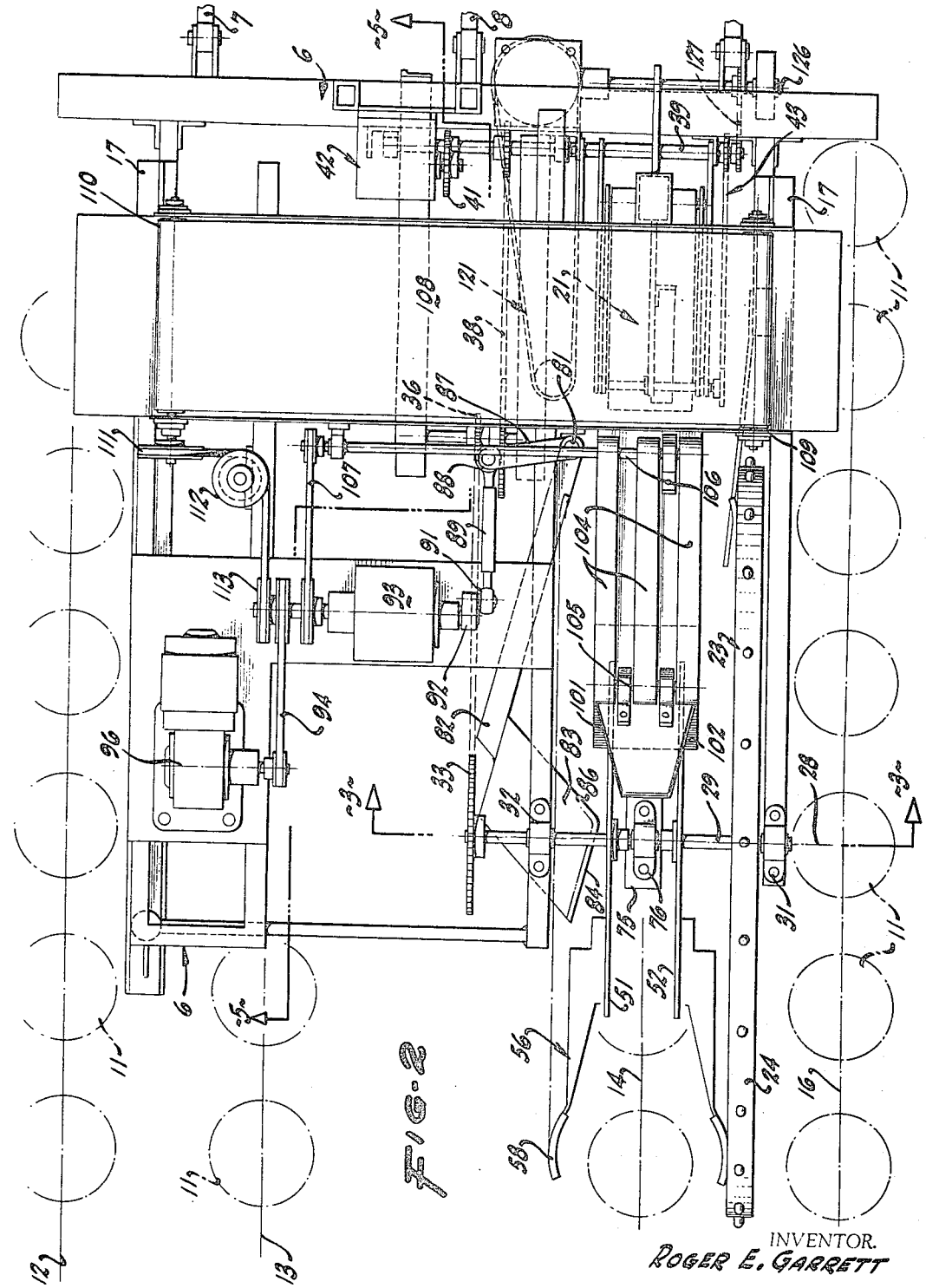
FIGURE 2 is a plan of the mechanism of FIGURE 1 also illustrating by conventional means the location of the growing lettuce heads.

In general, the lettuce harvester disclosed herein is patterned after that in the above-identified copending application, to which reference is made for more detailed description of certain of the parts of the apparatus. As in the other instance, the present machine includes a main frame 6 designed to be joined by attaching levers 7 and 8 to a draft implement such as a tractor and to be at least partially supported thereon. The frame 6 is comprised of a number of structural channels and shapes and is designed to be propelled in a field in the direction of the arrow 9 and in a location so that the machine is adjacent a pair of twin rows of lettuce heads.

The lettuce heads 11 are represented as geometrical figures which are only rough approximations since the heads themselves vary in shape and location and also have a number of wrapper leaves disposed in random array. In actuality, the wrapper leaves of adjacent heads often touch. The lettuce heads 11 are disposed in a row 12 close to a row 13 which in turn is separated a substantial distance from a row 14 close to a row 16, the rows 12 and 13 being one twin row and the rows 14 and 16 being another twin row. The frame 6 is arranged so that the mechanism straddles portions of the various twin rows, being partly supported in position on runners 17. While but one row of lettuce heads is worked upon by the illustrated machine, for normal commercial use the mechanism is multiplied on the frame 6 so that more than one of the rows of lettuce heads can be simultaneously encountered and harvested.

Mounted on the frame 6 and in a position to override one of the rows 14 of lettuce heads 11 is a sensing mechanism 21 of the sort shown in the above-identified application. This has the facility, in riding along on the tops of the lettuce heads, of determining whether or not each individual lettuce head is ready for harvesting. This is a function of the firmness of the head and results in the withholding or the sending of a signal from the detecting mechanism 21. This signal, showing sufficient firmness, is of an electrical nature, preferably an electrical pulse.

Disposed on the frame 6 substantially to the rear of the impulse or detecting mechanism 21 is a ground-engaging wheel 23. This wheel is of a releatively large diameter and has a thin rim 24 from which a number of radial spokes 26 extend on the outside to serve as driven lugs and likewise extend on the inside to engage a central hub 27. The hub and wheel are designed to rotate about a transverse axis 28. This is also the axis of a mounting shaft 29 disposed in journal blocks 31 and 32 on the frame 6 and carrying a sprocket 33. As the frame 6 advances, the wheel 23 is rotated without substantial slippage despite the condition of the ground on which the machine is supported. By means of the sprocket 33 the wheel drives a chain 34 extended to and engaging a sprocket 36 on a lay shaft 37. Another chain 38 from the lay shaft extends to a countershaft 39 from which a chain 41 extends the drive to an impulse storage mechanism 42 of the sort disclosed in my copending application. A drive mechanism 43 advances the belt 44 of the sensing mechanism 21, so that all of the driven structures on the frame 6 are operated in accordance with the speed of advance of the frame 6 over the ground, there being little or no slippage because of the nature of the wheel 23.

The hub 27, being secured to the shaft 29, causes simultaneous rotation therewith of a pair of latch disks 51 and 52 mounted and affixed on the shaft 29. The latch disks and their attendant mechanisms are all substantially duplicated on opposite sides of a central plane of symmetry so that description of one applies equally to the other.

On the disk 51 and duplicated on the disk 52 are radial arrays of mounting plates 53, each carrying a pivot pin 54. At one end, one of a number of holders 56 is journalled on the pivot pin 54 for rotation thereon. Each holder 56 is conveniently fabricated of a relatively thin, metal channel-like member offset from the pin 54 and extending generally radially from the disk 51 to a point adjacent the ground. At its radially outward portion the holder 56 changes from channel cross section into a relatively flat cross section and is bent to afford a curved finger 57 having approximately the radius of curvature of an average head of lettuce of the size to be harvested. The interior surface of the curved finger 57 is lined with a sponge rubber cushion 58 or comparable yielding and accommodating material.

Figure 3:
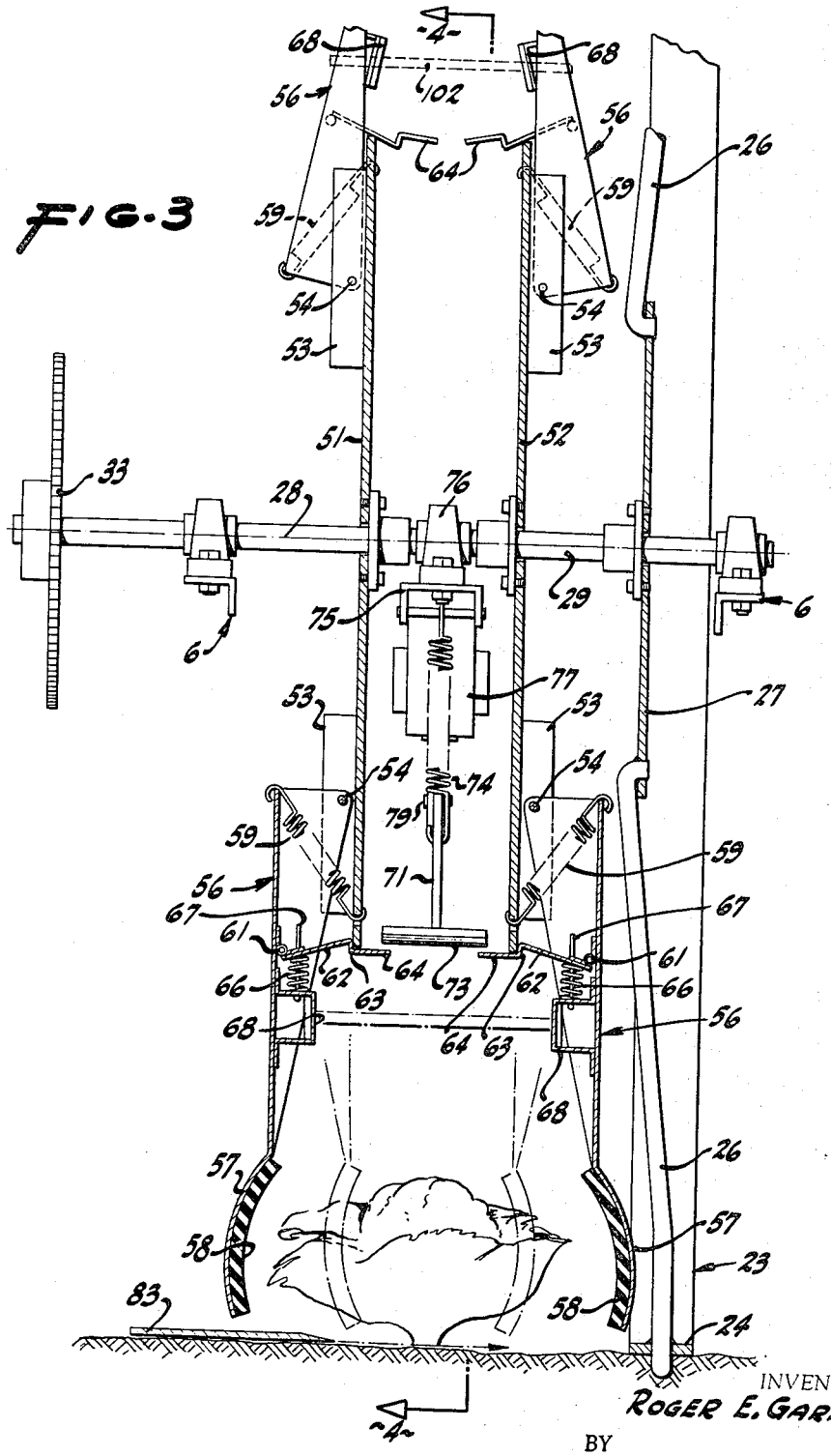
FIGURE 3 is a cross section, the plane of which is indicated by the line 3—3 of FIGURE 2.
Figure 4:
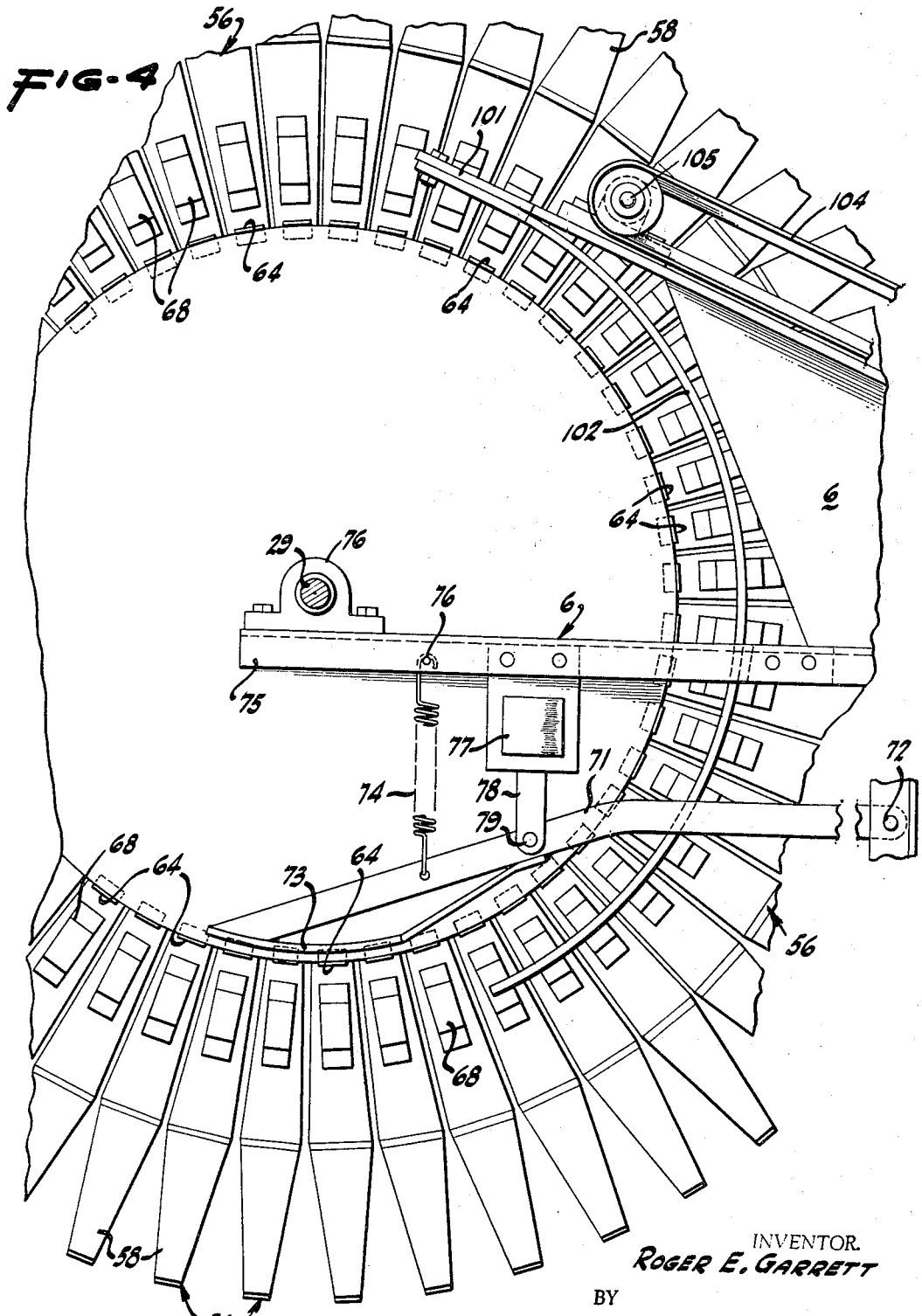
FIGURE 4 is a cross section, the plane of which is indicated by the line 4—4 of FIGURE 3, certain portions of the figure being broken away to reduce its size.
Figure 5:
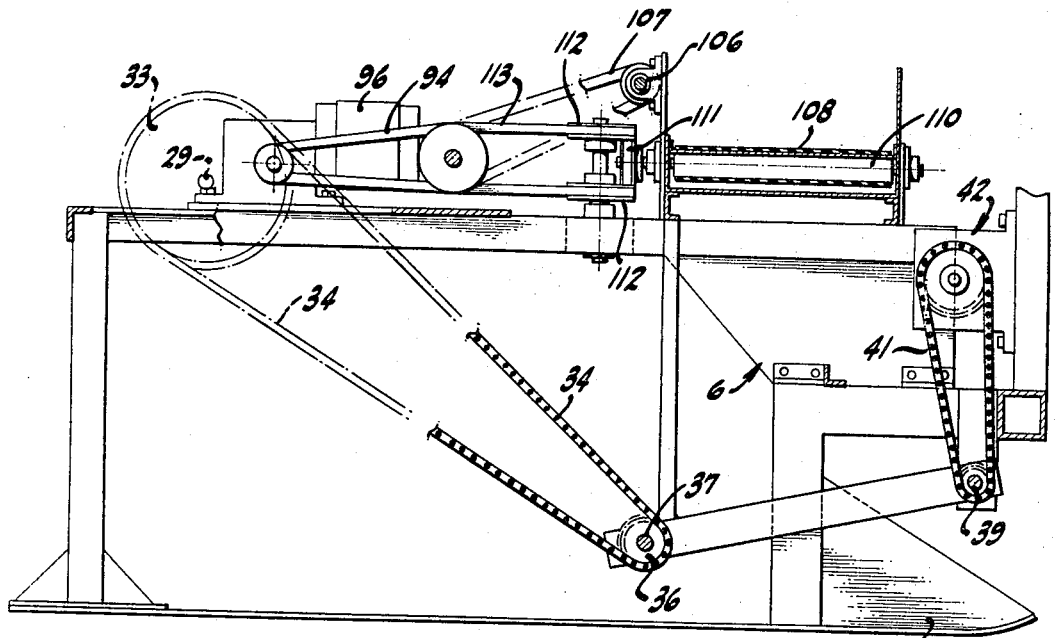
FIGURE 5 is a cross section, the planes of which are indicated by the lines 5—5 of FIGURE 2.

The holder 56 is urged by a coil spring 59 to move about the pivot 54 in such a direction as to move the finger 57 toward the center plane of symmetry of the device. The springs 59 are relatively strong and are anchored at one end in the disks 51 and 52 and are anchored at the other end in the channel portion of the individual holders 56. When left to itself, the spring 59 is effective to swing the left-hand holder 56 in a counterclockwise direction as seen in FIGURE 3, but is restrained for much of the time by a latch mechanism.

Secured to the holder 56 in the channel portion thereof is a hinge 61 carrying a latch lever 62 having an offset latch 63 and a tongue 64 projecting therefrom. A spring 66 surrounding a rod 67 engages the latch lever 62 and rests on one face of a rounded arch bracket 68 mounted on the holder 56. When the spring 66 is effective to hold the latch lever 62 with the latch portion 63 in juxtaposition with the rim of the adjacent disk 51 or 52, the holder 56 is restrained and held in its spread or outermost position, a position a substantial distance away from even the largest lettuce head which is likely to be encountered in the row being harvested.

The detecting mechanism 21 is effective when it encounters an appropriate lettuce head to send out a corresponding signal which is stored in the storage mechanism 42 as the mechanism advances. When the shaft 29 is almost directly above the detected lettuce head, means are provided for making the stored signal effective at a predetermined time to unlatch appropriate ones of the holders 56.

A lever 71 is pivoted at its forward end on the frame 6 so that the lever can swing about a pivot pin 72 a substantial distance ahead of the shaft 29. The lever 71 at its rearward portion is enlarged to afford a shoe 73 of sufficient width to span almost all of the distance between the disks 51 and 52 and of a length to overlie several latch tongues 64 on each side. The lever 71 is normally held above and out of contact with the tongues 64 by a spring 74 attached at its lower end to the lever 71, but also at its upper end is attached to a frame bar 75 also carried by a bearing 76 on the shaft 29. Under most circumstances, the shoe 73 is lifted completely out of contact with the latch tongues 64. However, when the shaft 29 is substantially immediately above the particular lettuce head detected, then a signal released from the storage device 42 is effective upon an electrically actuated solenoid 77. This is mounted on the frame bar 75 and has a depending armature 78 connected by a pivot pin 79 to the lever 71. When the solenoid 77 is energized by the incoming pulse, the armature 78 is repelled. This drives the arm 71 downwardly about the pivot 72 not only tensioning the spring 74 but abruptly driving the shoe 73 downwardly to encounter the latch tongues 64 of two or more opposite holders 56. The extent of movement is such that several latch levers 62 are simultaneously released from the disks 51 and 52, not only stressing the springs 66, but freeing the holders 56 so that the springs 59 are effective to cause rotational movement of the opposite holders toward each other.

The released holders swing inwardly toward each other until such time as they encounter and lie against the opposite, lateral sides of the detected head of lettuce to be harvested. Since the holders are pressed against the lettuce head merely by the force of the springs 59 and the contact is tempered by the cushioning of the lining 58, no injury occurs to the lettuce head by reason of this interengagement. Since the springs 59 alone drive the holders, it is immaterial if the lettuce center and the machine center are laterally displaced a moderate amount. The lettuce head is engaged on opposite sides by arcuate holders and is thus afforded lateral support at areas considerably above its stem or root in the ground. The lettuce head is thus stabilized not only by its attachment to its root as always, but is additionally supported by reason of the forces exerted by the released holders 56.

At this juncture and as the lettuce head is grasped, the lettuce head is severed from its stem. In a fashion similar to but somewhat modified from the severing means utilized in the prior machine, a vertical shaft 81 is mounted on the frame 6 for rotation in appropriate journals. At its lower end the shaft carries a knife lever 82. At its trailing end the knife lever enlarges into a relatively extensive, flat blade 83 having a diamond-shaped contour in plan and having adjacent V-edges 84 and 86 sharpened. The plane of the blade 83 is at, slightly above or even slightly below the ground level.

To actuate the blade, the shaft 81 at its upper end is provided with an arm 87 carrying a ball connection 88 to an adjustable link 89. The other end of the link is joined by a ball connection 91 to a crank 92 at the end of a single cycle clutch mechanism 93. The mechanism 93 is driven by a belt connection 94 from a prime mover 96 mounted on the frame 6 and controlled by an impulse from the storage mechanism 42. It is found in practice that the same pulse which energizes the solenoid 77 can likewise be utilized to actuate the single cycle clutch 93. The release of the latch levers 62 and the engagement of the holders 56 with the sides of the lettuce head occurs slightly faster than the swinging movement of the knife blade 83. By the time the knife blade has swung laterally from its ineffective side position into and through its active severing position, the selected lettuce head has already been engaged by the holders and is supported adequately on opposite sides. The severance of the lettuce head from its root is accomplished cleanly and quickly with little or no dislodgment of or damage to the lettuce and particularly without disturbing the adjacent lettuce heads. The machine is effective to engage and sever but a single lettuce head at a time even though the successive lettuce heads in the row are immediately adjacent thereto and virtually or actually in contact therewith.

The operation of the single cycle clutch mechanism 93 causes the crank 92 to make one complete revolution and then stop for each received impulse. The knife blade 83, therefore, moves from its retracted, ineffective position into and through its cutting position and then back again to its inactive position when the crank 92 completes its single rotation and is held ready for another cycle.

Since each holder 56 is mounted as a radial arm on the revolving shaft 29, its outer end 57 or a point thereon particularly partakes of a cycloidal motion as the machine advances. The portion of the cycloidal path of the outer end 57 adjacent the ground, although actually curved, is very nearly rectilinear and vertical. Stated differently, even though the end 57 is rotating with respect to the shaft 29, it moves very nearly in a vertical path relative to the ground when it is near the ground. Thus, as the frame 6 advances, the lowermost holders 56, being engaged with a lettuce head just severed from its root, lift the lettuce head almost vertically from its growing position upwardly between the adjacent lettuce heads, there being so little fore and aft motion that the adjacent heads are not disturbed and the engaged head is not dislodged. As the machine advances, the forward or rearward motion of the grasped lettuce head is not substantial until such time as the severed head has been lifted considerably above the lettuce heads remaining in the row. There is consequently little or no interference and the severed head is cleanly and uneventfully lifted from its growing position.

The severed lettuce head thus grasped and extracted from its fellows is carried alongside the periphery of the wheel up to and slightly past top center position. In that vicinity the rounded brackets 68 on the inner sides of the holders 56 begin to encounter and eventually to ride upon the entering wedge 101 of a spreading cam. The configuration of the wedge 101 is continued by a cam strip 102 curved around the shaft 29 as a center and extending for over a third of the periphery of the wheel. As the rotating brackets 68 engage with the stationary entering wedge 101, they are cammed apart and separate from each other far enough so that the previously grasped lettuce head is released. The lettuce head then falls by gravity onto discharge conveyor belts 104 disposed between the holders and at one end trained around pulleys on a shaft 105. At the other end the belts 104 are trained about pulleys on a shaft 106 extending transversely of the machine and driven by a belt 107 from the drive belt 94.

The released lettuce head is carried forwardly of the frame of the machine and eventually is discharged from the belts 104 onto a transverse conveyor belt 108. This is mounted on a roller 109 adjacent one side of the frame 6 and extends around a roller 110 adjacent the other side of the frame. The roller 110 is driven by a cross belt 111 having turn pulleys 112 and engaging a pulley 113 on the continuously rotating drive shaft of the single cycle clutch 93. Once on the belt 108, the lettuce head is carried transversely of the frame to an appropriate point for further handling. During all of the transference of the severed lettuce head from its initial location adjacent the ground to its final discharge from the belt 108, the lettuce head is carried gently and is not subjected to any sharp or severe forces or contacts. The lettuce head thus is transmitted for further handling in excellent condition and without damage.

As the holders 56 continue around the wheel against the cam strip 102, they descend and approach their former position. During this time and as they are fully spread apart either by the entering wedge 101 alone or shortly therefore on the cam strip 102, they are separated sufficiently and the brackets 68 are moved far enough apart so that the latch levers 62 are again forced into engagement with the disks 51 and 52 by the springs 66, the force of the springs 59 having been overcome by the spreading cams. The opposite holders are therefore repositioned in latch location ready for reuse upon receipt of a signal emanating from another lettuce head awaiting harvest.

Figure 6:
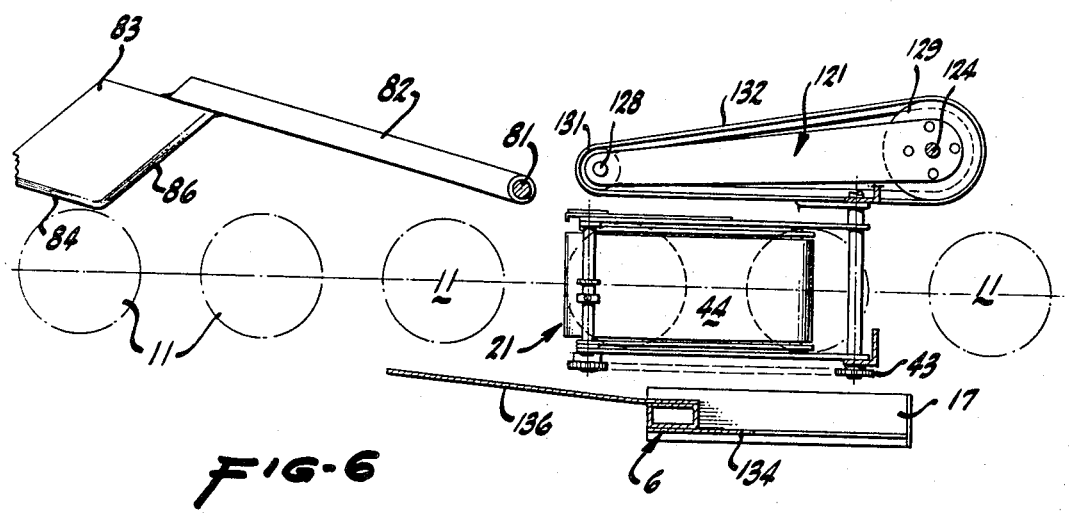
FIGURE 6 is a cross section, the plane of which is indicated by the line 6—6 of FIGURE 1.

Under some conditions of operation, although not always utilized, it is found that the performance of the machine is improved by providing a crowder 121 (FIGURE 6) adjacent the detector 21. Under these circumstances, the frame 6 is provided with a depending pedestal 122 carrying a frame plate 123 extending rearwardly. Near the forward end of the frame plate and extending through the pedestal 122 is a drive shaft 124 having an angle gear drive to a shaft 126 connected by a chain 127 to the adjacent drive mechanism. Parallel to the shaft 124 and on the frame plate 123 is an idler shaft 128. The shafts 124 and 128 carry pulleys 129 and 131 around which a flexible belt 132 is trained. The location and height of the belt are such that one run of the belt is disposed alongside the row of lettuce heads. The crowder belt tends to engage some of the wrapper leaves and tends to make the machine elements encounter the lettuce heads in such a location that the sensing device 21 travels appropriately over the uppermost or crown portion of the lettuce heads.

Opposite the crowder belt 132 the frame 6 depends and is partially supported by one of the runners 17 intended to run along the surface of the ground. This runner has an extensive upright wall 134 continued by a rearwardly and inwardly converging wall 136. This also has the effect of confining the wrapper leaves and of insuring that the space between the inside of the crowder belt 132 and the inside of the walls 134 and 136 is appropriately disposed with regard to the line 14 of lettuce heads being harvested.

What is claimed is:

1. A lettuce harvester comprising a frame, means for supporting said frame for advancement in a field containing growing lettuce heads, means on said frame for emitting a signal upon encountering one of said lettuce heads acceptable for havesting, means on said frame for grasping a lettuce head, means for urging said grasping means into grasping position, means fore restraining said grasping means from moving into grasping position, and means responsive to said signal for inactivating said restraining means.

2. A lettuce harvester comprising a frame, means for passing said frame over a succession of lettuce heads, means on said frame responsive to the firmness of said lettuce heads for selecting certain ones of said lettuce heads, means on said frame for grasping lettuce heads, and means on said frame controlled by said selecting means for activating said grasping means.

3. A lettuce harvester comprising a frame, means for advancing said frame over a succession of growing lettuce heads, means on said frame for selecting certain ones of said heads for harvesting, means on said frame for severing a lettuce head from its root, means on said frame for grasping a lettuce head and supporting said lettuce head for interaction with said severing means, and means on said frame controlled by said selecting means for activating said grasping means and said severing means.

4. A lettuce harvester as in claim 3 in which said grasping means includes a pair of holders engaging said lettuce head on opposite sides.

5. A lettuce harvester comprising a frame, means for supporting said frame for advancement in a field containing growing lettuce heads, a pair of holders, means for mounting said holders on said frame to lie on opposite sides of one of said lettuce heads, means on said frame controlled by the firmness of said lettuce head for moving said holders into grasping and supporting relationship with said opposite sides of said lettuce head, means on said frame for severing said grasped and supported lettuce head from its root, and means on said frame for lifting said holders and said grasped, severed lettuce head from said field.

6. A lettuce harvester comprising a frame, means for supporting said frame for advancement in a field containing growing lettuce heads, a plurality of pairs of holders, means for mounting said pairs of holders on said frame to lie on opposite sides of and horizontally spaced from said lettuce heads, means on said frame responsive to an encounter with a lettuce head suitable for harvesting, and means on said frame controlled by said responsive means for moving selected ones of said pairs of holders into grasping engagement with said lettuce head.

7. A lettuce harvester comprising a frame, means for supporting said frame for advancement in a field containing growing lettuce heads, a plurality of pairs of holders, means for mounting said pairs of holders in a circular array for rotation on said frame around a transverse horizontal axis, means on said frame for so rotating said pairs of holders on opposite sides of but spaced from said lettuce heads as said frame advances in said field, means on said frame for severing said lettuce heads from their roots, and means for moving the lowermost ones of said pairs of holders into engagement with select ones of said lettuce heads prior to severance of said selected lettuce heads from their roots.

8. A lettuce harvester comprising a frame, means for supporting said frame for advancement in a field containing lettuce heads, a pair of holders, means for mounting said holders on said frame for movement between an upper position and a lower position, said holders being on opposite sides of said lettuce heads, means for mounting said holders for movement toward and away from each other, means on said frame for moving said holders toward each other to grasp one of said lettuce heads and in an upward direction while grasping said lettuce head, and means for severing said one lettuce head from its root.

9. A lettuce harvester comprising a frame, means for supporting said frame for advancement in a field containing growing lettuce heads, a hub, means for mounting said hub on said frame for rotation about a transverse horizontal axis, means for so rotating said hub during said advancement of said frame, a pair of holders, means for mounting said holders on said hub for rotation therewith about said axis and for movement toward and away from each other, spring means for urging said holders toward each other, latch means for holding said holders apart when engaged, cam means for moving said holders away from each other and said latch means into engagement, and means responsive to a lettuce head in said field for disengaging said latch means.

10. A lettuce harvester as in claim 9 in which said rotating means rotates said hub at an angular velocity such that the peripheral rotational speed of said holders is substantially the same as the speed of advancement of said frame in said field.

11. A lettuce harvester comprising a frame, means for supporting said frame for advancement in a field containing a growing lettuce head, means on said frame for determining if said lettuce head is ready for harvesting, means on said frame responsive to said determining means for severing said lettuce head from its root, and means on said frame for supporting said lettuce head as said lettuce head is severed from its root.

12. A lettuce harvester comprising a frame, a hub, means for mounting said hub on said frame for rotation about a transverse horizontal axis, means for rotating said hub, a pair of holders, means for mounting said holders to extend radially from said hub in axially spaced locations and for swinging movement toward and away from each other, spring means for urging said holders toward each other, a part-circle cam on said frame concentric with said axis and interposed between and engaging said holders for forcing said holders apart in the rising portion of the rotational path of said holders, latch means for holding said holders apart, means on said frame for tripping said latch means when said holders are free of said cam in the lower portion of the rotational path of said holders, and a conveyor on said frame between said holders and in the upper portion of the rotational path of said holders.

13. A lettuce harvester comprising means responsive to the firmness of a lettuce head for determining if said lettuce head is ready for harvesting, a pair of holders, means responsive to said determining means for resiliently urging said holders against opposite sides of a lettuce head, a severing means, means responsive to said determining means for operating said severing means to sever said lettuce head from its root while said holders are against said lettuce head, and means for moving said holders with a severed lettuce head therebetween away from said root.

14. A lettuce harvester comprising a frame, means for supporting said frame for advancement in a field containing a growing lettuce head, a plurality of fingers, means for mounting said fingers on said frame to lie along one side of and horizontally spaced from said lettuce head, means for urging each of said fingers into grasping engagement with said lettuce head, means for restraining each of said fingers from moving into engagement with said lettuce head, and means for inactivating said restraining means on all of said plurality of fingers simultaneously.

References Cited
UNITED STATES PATENTS

| | | | |
|---|---|---|---|
| 1,578,162 | 3/1926 | Monthan | 171—56 |
| 1,719,871 | 7/1929 | Burto | 171—56 |
| 2,522,308 | 9/1950 | Silva | 56—327 |
| 3,066,469 | 12/1962 | Chatagnier | 56—327 |
| 3,176,456 | 4/1965 | Franzen | 56—327 |

ANTONIO F. GUIDA, *Primary Examiner.*

RUSSELL R. KINSEY, *Examiner.*